United States Patent

Mawhinney

[15] 3,659,223

[45] Apr. 25, 1972

[54] MICROWAVE OSCILLATOR WITH TWO OR MORE PARALLELED SEMICONDUCTIVE DEVICES

[72] Inventor: Daneil David Mawhinney, Livingston, N.J.

[73] Assignee: RCA Corporation

[22] Filed: Oct. 30, 1970

[21] Appl. No.: 85,402

[52] U.S. Cl. ...............................331/107 R, 331/56, 331/96
[51] Int. Cl. ...............................H03b 7/14
[58] Field of Search ...............................331/56, 107, 96

[56] References Cited

UNITED STATES PATENTS 3,593,186 10/1971 Dench...............................331/107 R

*Primary Examiner*—John Kominski
*Attorney*—Edward J. Norton

[57] ABSTRACT

Two or more paralleled negative resistance semiconductive devices are mounted inside a microwave cavity in a plane transverse to the direction of microwave propagation. The devices are located at points within the cavity so that the electric field and resulting microwave impedance is the same at each device position. The devices are individually loaded without effecting others in the circuit, resulting in the sum of the microwave energy generated by the respective devices being coupled efficiently to a terminating load.

6 Claims, 3 Drawing Figures

INVENTOR.
DANIEL D. MAWHINNEY
BY
Edward J. Norton
Attorney

MICROWAVE OSCILLATOR WITH TWO OR MORE PARALLELED SEMICONDUCTIVE DEVICES

DESCRIPTION OF THE PRIOR ART

Microwave oscillators using negative resistance semiconductive devices have been previously built. A single negative resistance semiconductive device is sometimes not capable of generating the desired amount of microwave energy. Attempts have been made to utilize many such devices, either in parallel or in series, in order to increase the available output power from the microwave oscillator. Some of these attempts mounted the devices inside a resonant cavity along the direction of microwave propagation. The low microwave impedance level of the devices complicated the circuit design and made it desirable to separate the devices by a spacing substantially one-half wavelength at the fundamental frequency of operation. When the devices were thus separated, the resulting circuit was susceptable to problems associated with improper phase conditions between devices, which decreased the resulting output power. The band of frequencies over which such circuits could be turned was limited because the spacing between devices is critical and frequency dependent. It was difficult to match individual devices in the circuit without adversely effecting the other devices. The problems were magnified as the operating frequency and number of devices employed were increased.

SUMMARY OF THE INVENTION

Two or more negative resistance semiconductive devices are connected in parallel inside a microwave cavity in a plane transverse to the direction of propagation of microwave energy. The microwave cavity is designed so that the semiconductive devices are positioned in the plane at points where the magnitude of microwave impedance and the intensity of electric field are the same. Each of the devices can be individually tuned without effecting the response of other devices in the same reference plane.

DESCRIPTION OF THE DRAWING

Figure 1:
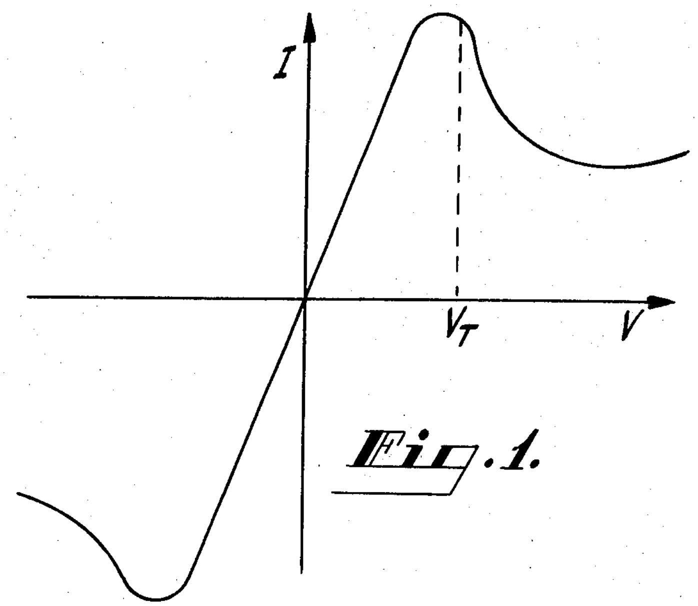
FIG. 1 is a typical plot of D.C. current I versus D.C. bias voltage V for a bulk-effect negative resistance semiconductive device useable in the circuit of the disclosed invention.

Referring to FIG. 1, there is shown the typical D.C. current I versus D.C. voltage V curve for a bulk-effect semiconductive device. A suitable bias is applied across the terminals of the semiconductive device and an increase in the voltage V will produce a corresponding increase in current I until the electric field in the semiconductive device exceeds a certain threshold $V_T$. At this point the electrons in the device have enough energy to transfer to another conduction band with higher energy and lower mobility. This results in a decrease of average mobility, and thus a decrease in conductivity, as the field increases. Therefore a region of negative resistance is created. In this negative resistance region the current drops and remains nearly constant with increasing voltage. Coincident with the drop in current the semiconductive device oscillates at a natural frequency which is dependent on the thickness of the semiconductor wafer, if the device is operating in the transit time mode. However, in practice it is possible to vary the oscillation frequency from its natural value by coupling to an external high-"Q" cavity, and changing the resonant frequency of the cavity. If the semiconductive device is operating in the limited space charge accumulation mode, the frequency of oscillation is controlled by material properties or circuit waveforms and is independent of the wafer thickness and more dependent on the resonant frequency of the microwave circuit to which it is coupled.

Figure 2:
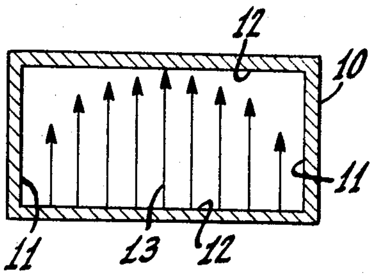
FIG. 2 is a cross sectional view of a rectangular waveguide depicting the $TE_{10}$ mode, and vectors representing the magnitude of the electric field present.

Referring now to RIG. 2, there is shown a cross section of a typical hollow rectangular waveguide 10. The inside dimensions of the narrow walls 11 and the broad walls 12 of the waveguide, normally determine the frequency of operation and the dominent mode of electromagnetic propagation. The vectors 13 inside the waveguide illustrated in FIG. 2, represent the magnitude and direction of the electric field intensity present. Assume that the direction of propagation of electromagnetic energy is into the waveguide in FIG. 2, and that the electric field is symmetric and transverse to the direction of propagation with only one maxima of electric field present along the broad walls 12, and no electric field present at the narrow walls 11. These conditions would describe the dominent waveguide mode present in FIG. 2, as being the Transverse Electric or $TE_{10}$ mode. The magnitude of microwave impedance along the cross section in FIG. 2 is dependent on the value of the electric field present and is therefore symmetric about a maximum magnitude of microwave impedance at the center of the waveguide 10, and a minimum valve at the narrow walls 11.

The magnitude of the microwave impedance of a bulk effect semiconductive device is in the order of 6 ohms. The microwave characteristic impedance at the center of rectangular waveguide 10 can vary from less than 500 to more than 1,000 ohms depending on the frequency of operation and the size of the waveguide 10 used. Therefore, an impedance transformation from the low impedance of the semiconductive device to that of the waveguide 10 must be effected if the device were to be used in a rectangular waveguide cavity.

Figure 3:
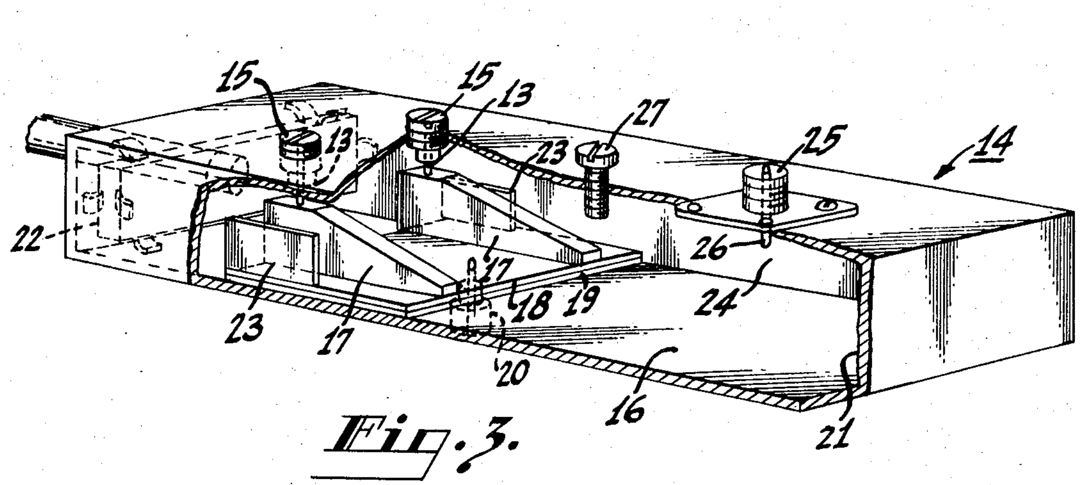
FIG. 3 is an isometric drawing of a microwave oscillator incorporating features of the present invention.

Referring now to FIG. 3, there is shown a microwave oscillator containing two parallel bulk effect semiconductive devices 13 inside a rectangular waveguide cavity 14 supporting the $TE_{10}$ mode. Fine threaded copper screws or diode mounts 15, are used to hold the semiconductive devices 13. The diode mounts 15 have a slotted circular hole at one end, suitable for gripping and holding a terminal of the outside casing of the semiconductive devices 13. The diode mounts 15, each holding a semiconductive device 13, are screwed into tapped holes in the broad wall 16 of the waveguide cavity 14. The fine threads and copper material of the mounts 15 assure adequate electrical contact with the walls of the waveguide cavity 14 and a heat sink for the individual semiconductive devices 13.

The semiconductive devices 13 are inserted into the waveguide cavity 14, in a plane transverse to the direction of microwave propagation. The magnitude of the microwave impedance and the intensity of the electric field, in the transverse plane containing the semiconductive devices 13, is symmetric about the center line of the broad wall 16 of the waveguide cavity 14. This is true because the dominent waveguide mode is the $TE_{10}$. Therefore, the semiconductive devices are positioned in the microwave cavity 14, at points of similar microwave impedance and electric field intensity.

The other terminals of the semiconductive devices 13 are coupled to linearly tapered impedance transformers 17 which aid in the transformation from the low impedance of the semiconductive devices 13 to the higher impedance of the waveguide cavity 14. The base 18 of the transformers 17 is the full width of the inside dimension of the broad wall 16 of the waveguide cavity 14 and substantially one-quarter of the guide wavelength, at the fundamental frequency of oscillation, in length. A sheet of dielectric material 19 is placed between the base 18 of the transformers 17 and the broad wall 16 of the waveguide cavity 14, creating a r.f. bypass capacitor. The r.f. bypass capacitor presents a low impedance at microwave frequencies and prevents r.f. leakage through a coaxial direct current bias connector 20. The center conductor of the bias connector 20 is connected to the base 18 of the transformers 17, and the outer conductor of the bias connector 20 is connected to broad wall 16 of the waveguide cavity 14. A bias signal can then be applied to the semiconductive devices 13 through the bias connector 20. The value of the bias supplied from a suitable source, not shown, is determined according to the threshold voltage of the devices 13 used, maintaining the devices 13 in their negative resistance operating region as discussed in connection with FIG. 1. The height of the waveguide transformers 17 is determined so that the outside casing of the semiconductive devices 13 is inside the waveguide cavity 14 and electrical contact is made by the semiconductive devices 13 to the impedance transformers 17 with minimum penetration into the waveguide cavity 14 by the copper screws 15.

A transverse shorting plate 21 is located at one end of the waveguide cavity 14, substantially one-half of the guide wavelength, at the fundamental frequency of oscillation, from the plane containing the semiconductive devices 13. The shorting plate 21, making good electrical contact with all four walls of the waveguide cavity 14, establishes an area of low microwave impedance in the vicinity of the semiconductive devices 13. A capacitive tuning screw 27 is centrally located between the shorting plate 21 and the plane containing the semiconductive devices 13, along the center line of the broad wall 16 of the waveguide cavity 14. The tuning screw 27 will vary the electrical length between the shorting plate 21 and the plane containing the semiconductive devices. A variable transverse shorting plate 22, also making good electrical contact with the four walls of the waveguide cavity 14, is located at the other end of the waveguide cavity 14. The position of the variable transverse shorting plate 22 is changed until the conjugate of the reactance of the semiconductive devices 13 appears at the plane containing the semiconductive devices 13. The reactance of the semiconductive devices 13 is canceled by its conjugate and a condition of resonance is established. Thus, the resonant frequency of the microwave oscillator can be tuned by the variable transverse shorting plate 22.

A separate section of microwave loading material 23 is spaced between each semiconductive device 13 and the narrow wall 24 of the waveguide cavity 14. The sections may be of carbon loaded ferrite or microloss, the size being determined according to the particular, individual characteristics of the respective devices 13. The sections of microwave loading material 23 have the effect of balancing the semiconductive devices 13, and the sections 23 aid in the summation of output power from the semiconductive devices 13. Each section of the microwave loading material has a greater effect upon the semiconductive device 13 in its proximity than upon the remote semiconductive device 13.

A coaxial output connector 25 is located along the center line of the broad wall 16 of the microwave cavity 14 where the electric field is maximum and the current density minimum, and any unintentional leakage of microwave energy is minimized. The capacitive probe 26 of the coaxial output connector 25 is coupled to the electric field generated by the parallel arrangement of the semiconductive devices 13. The resultant output microwave energy at the coaxial output connector is applied to a terminating load not shown. The position where the coaxial output connector 25 is located along the center line of the broad wall 16 of the microwave cavity 14 is selected so that the microwave impedance of the terminating load is matched.

In an oscillator constructed according to the arrangement of FIG. 3, a parallel arrangement of gallium arsinide bulk effect semiconductive devices operating in the transit-time mode generated 72 mw of CW power at 8.75 GHz while inside a waveguide cavity supporting the dominent $TE_{10}$ mode. Individually, the devices would generate 36 mw of CW power while operating in the waveguide cavity. The oscillator was tuned over the frequency range of 8.2 GHz to 9.2 GHz.

There are many other waveguide modes, both rectangular and circular, and other media of microwave transmission, such as slab line, that have two or more points, in a plane transverse to the direction of microwave propagation, where the magnitude of microwave impedance would be similar. Thus, in accordance with the present invention, it is possible to locate multiple negative resistance semiconductive devices, in a parallel arrangement, at these points and balance the devices with microwave loading material for the purpose of constructing a microwave oscillator. The type of microwave cavity in which the devices will operate is dependent on the peculiar boundary conditions that must be satisfied when using a particular type of negative resistance semiconductive device.

A preferred embodiment of the invention has been shown and described. Various other embodiments and modifications thereof will be apparent to those skilled in the art, and will fall within the scope of invention as defined in the following claims.

What is claimed is:

1. A negative resistance semiconductive device microwave oscillator comprising:
   - a microwave cavity designed to support electromagnetic energy with the electric and magnetic fields establishing at least two points within said microwave cavity wherein the microwave impedance and intensity of electric field are similar, said points being in a plane transverse to the direction of propagation of said electromagnetic energy.
   - a parallel arrangement of at least two of said semiconductive devices mounted within said microwave cavity with each of said devices positioned at one of said points,
   - sections of microwave loading material located adjacent to each of said semiconductive devices so as to have a loading effect on said semiconductive devices.

2. The microwave oscillator according to claim 1 further comprising: a rectangular waveguide cavity, said rectangular cavity being designed to support the dominant rectangular waveguide mode, $TE_{10}$, and having a transverse shorting plate located substantially one-half the guide wavelength, at the fundamental frequency of oscillation, from said transverse plane containing said semiconductive devices.

3. The microwave oscillator according to claim 2 further comprising: means for coupling each of said semiconductive devices to an impedance transformer within said rectangular waveguide cavity, whereby the r.f. impedance of said semiconductive devices is matched to the r.f. impedance of said rectangular waveguide cavity.

4. The microwave oscillator according to claim 3 further comprising: a bias circuit for applying a D.C. bias voltage across each of said semiconductive devices; said bias circuit having a r.f. bypass capacitor formed between said impedance transformer and a broad wall of said rectangular waveguide cavity, and a coaxial connector having a center conductor D.C. coupled to said impedance transformer.

5. The microwave oscillator according to claim 2 further comprising: means for providing an adjustable transverse shorting plate at the remaining extremity of said rectangular waveguide cavity, whereby a tuning adjustment is provided for the resonant frequency of said microwave oscillator.

6. The microwave oscillator according to claim 2 further comprising: a coaxial probe capacitively coupled to said electromagnetic energy generated by said parallel semiconductive devices, said coaxial probe located along the center line of the broad wall of said rectangular waveguide cavity, at a point that would match the microwave impedance of a terminating load.

* * * * *

UNITED STATES PATENT OFFICE
CERTIFICATE OF CORRECTION

Patent No. 3,659,223 Dated April 25, 1972

Inventor(s) Daniel David Mawhinney

It is certified that error appears in the above-identified patent and that said Letters Patent are hereby corrected as shown below:

Column 1, line 22, correct "turned" to read --tuned--.

Column 2, line 3, correct "RIG." to read --FIG.--.

Column 2, line 56, before "are" insert --13--.

Signed and sealed this 12th day of September 1972.

(SEAL)
Attest:

EDWARD M.FLETCHER,JR.
Attesting Officer

ROBERT GOTTSCHALK
Commissioner of Patents

ORM PO-1050 (10-69)
530 6|72

USCOMM-DC 60376-P69
☆ U.S. GOVERNMENT PRINTING OFFICE 1969 O—366-334